US008515660B2

(12) United States Patent
Grace et al.

(10) Patent No.: US 8,515,660 B2
(45) Date of Patent: *Aug. 20, 2013

(54) WATERCRAFT AUTOMATION AND AQUATIC EFFORT DATA UTILIZATION

(76) Inventors: Ted V. Grace, Valley, NE (US); Ryan T. Grace, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,021

(22) Filed: Nov. 22, 2011

(65) Prior Publication Data

US 2012/0066245 A1 Mar. 15, 2012

Related U.S. Application Data

(63) Continuation of application No. 11/875,659, filed on Oct. 19, 2007, now Pat. No. 8,082,100.

(51) Int. Cl.
*G05D 1/02* (2006.01)

(52) U.S. Cl.
USPC .......... 701/300; 701/1; 701/37; 701/45; 701/49; 340/425.5; 340/988; 438/461; 438/549

(58) Field of Classification Search
USPC .......... 701/1, 37, 45, 49, 200, 201, 300; 340/425, 425.5, 988; 438/457.1, 461, 549, 438/815.4, 815.45; 210/242.1; 56/8, 9; 414/242, 244; 440/30, 38, 73; 405/3, 52
See application file for complete search history.

(56) References Cited

U.S. PATENT DOCUMENTS

| 7,254,483 | B2 * | 8/2007 | Squires et al. .................... 702/2 |
| 8,082,100 | B2 * | 12/2011 | Grace et al. .................... 701/300 |
| 2001/0054961 | A1 * | 12/2001 | Twining .................... 340/573.1 |
| 2003/0230247 | A1 * | 12/2003 | Harris et al. .................... 119/230 |
| 2005/0162976 | A1 * | 7/2005 | Kuriyama et al. ............ 367/111 |
| 2008/0262666 | A1 * | 10/2008 | Manning .......................... 701/21 |
| 2012/0066173 | A1 * | 3/2012 | Grace et al. .................... 706/52 |
| 2012/0066246 | A1 * | 3/2012 | Grace et al. .................... 707/767 |
| 2012/0072102 | A1 * | 3/2012 | Grace et al. .................... 701/300 |

* cited by examiner

*Primary Examiner* — Mary Cheung
*Assistant Examiner* — McDieunel Marc
(74) *Attorney, Agent, or Firm* — Advent LLP; Ryan T. Grace

(57) ABSTRACT

Watercraft automation and aquatic data utilization for aquatic efforts are utilized for fishing and network communication. In one aspect, an anchor point is obtained and a water craft position maintenance routine is actuated to control the watercraft to maintain association with the anchor point. In another aspect, prior aquatic effort data is obtained in association with an anchor point. In yet another, aspect, current aquatic effort data is generated in association with an anchor point. In still another aspect, current aquatic effort data and prior aquatic effort data are utilized for prediction generation. In yet another aspect, current aquatic effort data and prior aquatic effort data are utilized to obtain another anchor point for a watercraft.

20 Claims, 10 Drawing Sheets

WATERCRAFT AUTOMATION AND AQUATIC EFFORT DATA UTILIZATION

This application is a continuation of U.S. application Ser. No. 11/875,659 filed Oct. 19, 2007. The complete disclosure of the aforementioned application is incorporated herein by reference.

BACKGROUND

Fishing efforts and aquatic life preservation efforts include a wide range of dynamic variables which may render such efforts difficult and taxing in many situations. Watercraft anchoring on an aquatic body is problematic in many scenarios. Watercraft anchoring is typically a static manual event that hinders dynamic and automated control of the boat. Historical aquatic data in many situations is non-existent. Any type of recording of historical aquatic data is typically manual and labor intensive. Current aquatic data suffers from many of the same frustrations as historical aquatic data. Furthermore, any type of success during an aquatic effort is usually the result of the experience of the angler or scientist and/or trial and error.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

Aspects of the disclosure pertain to watercraft automation and aquatic data utilization for aquatic efforts. In one aspect, an anchor point is obtained and a watercraft position maintenance routine is actuated to control the watercraft to maintain association with the anchor point. In another aspect prior aquatic effort data is obtained in association with an anchor point. In yet another aspect, current aquatic effort data is generated in association with an anchor point. In still another aspect, current aquatic effort data and prior aquatic effort data are utilized for prediction generation. In yet another aspect, current aquatic effort data and prior aquatic effort data are utilized to obtain another anchor point for a watercraft.

BRIEF DESCRIPTION OF THE DRAWINGS

Non-limiting and non-exhaustive features are described with reference to the following figures, wherein like reference numerals refer to like parts throughout the various views unless otherwise specified.

DETAILED DESCRIPTION

Figure 1:
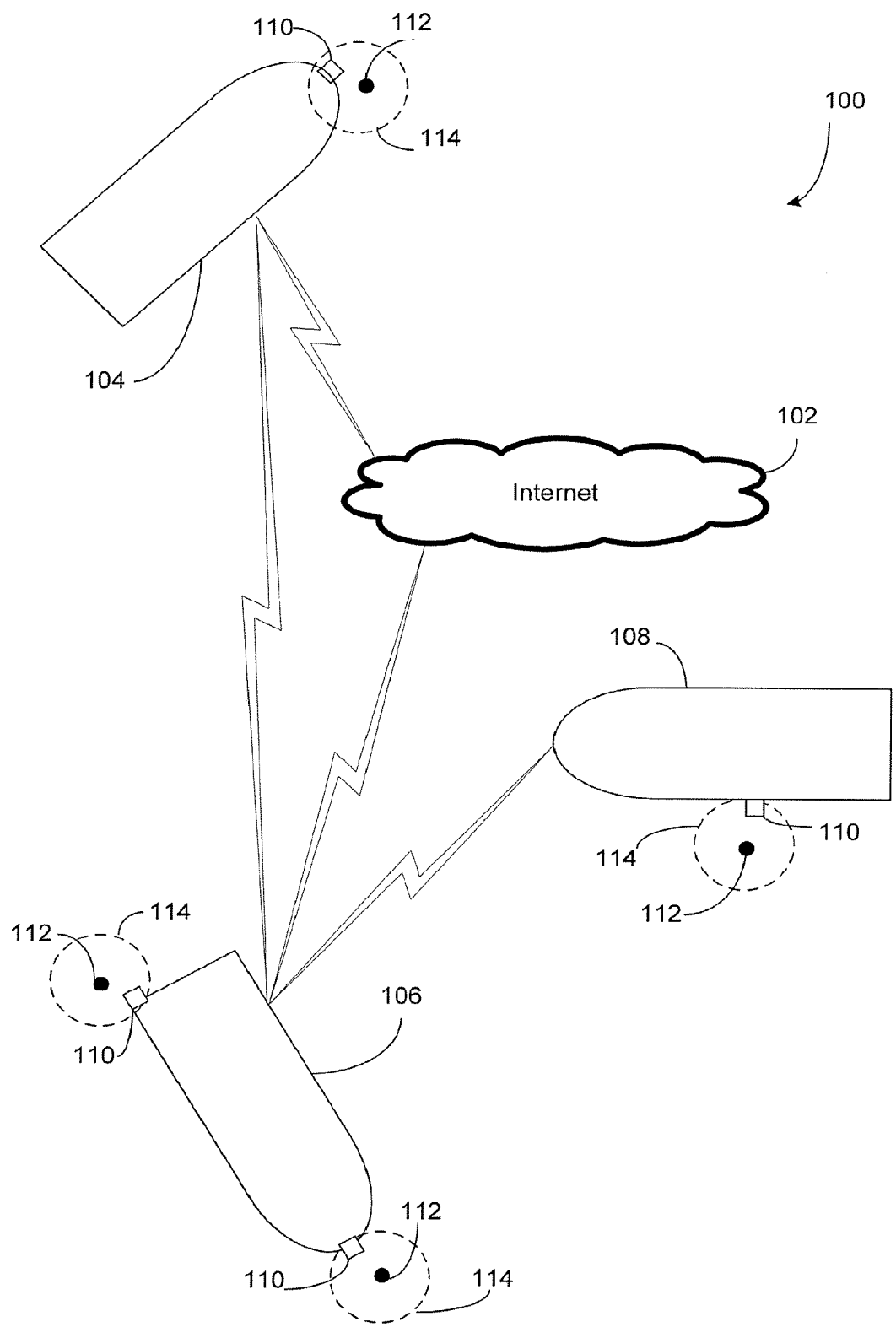
FIG. 1 represents exemplary network overviews for watercraft anchoring and automation.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the disclosure. Accordingly, the logical operations making up the embodiments described herein are referred to alternatively as operations, steps or modules.

Aspects of the disclosure pertain to watercraft automation and aquatic effort data utilization. As the disclosure below makes clear, an anchor point is obtained and a watercraft position maintenance routine is actuated to propel the watercraft to maintain association with the anchor point. As one example, an angler may mark a fishing spot with a global positioning service (GPS) coordinate and/or the like. Perhaps the fishing spot is next to a dock. When the angler returns to the anchor point, the angler may engage a trolling device. The angler may actuate a position maintenance routine for the GPS coordinate that is next to the dock. In doing so, the troller may automatically propel the watercraft toward the GPS coordinate. The troller maintains the watercraft at, or within a tolerance of, the GPS location. As another example, the angler may utilize aquatic tours that are locally stored, remotely stored or dynamically updated to the computing device associated with the watercraft. In this manner, the angler may utilize an aquatic tour to have the watercraft automatically navigate and maintain anchor points on the aquatic tour. In other aspects, an angler may allow a controlled drift from an anchor point. For example, a river current may be flowing at seven miles an hour. The angler may only want drift at two miles an hour. Accordingly, the position maintenance routine may be utilized to offset the river current by five miles an hour so that the watercraft drifts from the anchor point at two miles an hour.

Anchoring a watercraft with a trolling device provides many unforeseeable advantages in the angling and scientific world. Weighted anchors may be eliminated from a watercraft. Watercrafts are effortlessly anchored to a point and weighted anchors are not intruded into the aquatic environment. Watercraft drift is controlled. Watercraft maneuvering is also improved. For example, an angler may set an anchor point at a dock. When actuated, the trolling device may pull up next to a dock so an angler may exit the watercraft. Anchoring with a trolling device is a dynamic event and anchor points may easily be changed. In the situation where two trolling devices are implemented on the watercraft, the angler may easily spin the watercraft by switching the anchor points of the trolling devices. Also, in the situation where two trolling devices are implemented, the angler may maintain a rear portion of the watercraft with respect to the front portion of the watercraft so that the ends of the watercraft do not drift with respect to one another. Other advantages include providing a "data container" associated with the anchor point. For example, the GPS location may also be an identifier to associate data such as current aquatic effort data, prior aquatic effort data, services, etc. The "data container" may also facilitate predictive generation. Still other advantages provide aquatic tour association to automate anchor points and aquatic body navigation.

As the disclosure below also makes clear, current aquatic effort data may be associated with a "data container" of the anchor point. As one example, an angler may set an anchor point near a dock. The data container associated with the anchor point may automatically populate with such data as the temperature of the water, weather conditions, equipment types, caught aquatic life, duration at the anchor point, etc. This data may be locally stored, remotely stored and/or dynamically stored as the data is generated. The data may remain private or made public for other anglers.

Collecting current aquatic effort data in such a manner provides many unforeseeable advantages in the angling and scientific world. Data may be easily and efficiently collected and associated with an anchor point on an aquatic body. Trends may be realized. Data may be easily made accessible for other anglers. An angler may easily collect that relevant data and associate the data with the duration of the position maintenance routine that is anchoring the watercraft to a position on the aquatic body. In this manner, angling time may be compared to a quantity of aquatic life caught. The current aquatic effort data may also be utilized to update a position maintenance routine.

As the disclosure below also makes clear, prior aquatic effort data may be obtained from a "data container" of the anchor point. For example, an angler may return to a prior angling spot and easily access the angler's prior history at the angling spot by using an anchor point identifier to automatically obtain prior aquatic effort data associated with the anchor point identifier. The angler can access prior equipment used, water conditions, success at the angling spot, duration of the position maintenance routine at the angling spot etc. In the situation where the angler has never been to the fishing spot before, the angler may access prior aquatic effort data on a network or data that has been uploaded to a computing device associated with the watercraft. Therefore, the angler may realize angling tactics that have worked for other anglers in the past. The prior aquatic effort data may include blog information and guide information. As an example, a blog from a prior angler may tell the current angler to "cast near the dock." The prior angler may have associated a quantity of aquatic life caught near the dock.

Obtaining prior aquatic effort data in such a manner provides many unforeseeable advantages in the angling and scientific world. Trends may be easily identified. Tours may be automated and networked. A watercraft may be easily and effortlessly controlled to account for the prior aquatic effort data and/or to account for the prior aquatic effort data in light of the current aquatic effort data. During slow times, the angler may be entertained with blog data. Relevant internet services may be obtained that are associated with past trends. The prior aquatic effort data may also be updated with the angler's current aquatic effort data to dynamically and automatically keep the prior aquatic effort data up to date. Aquatic tour services may easily set up automated tours for anglers.

For example, an aquatic tour service may review the prior aquatic effort data and generate a tour that has been successful in the past. The tour may then be made public so that current anglers can automate a position maintenance routine to take the tour.

As the disclosure below further makes clear, predictive suggestions may be generated in association with the anchor point. The current aquatic effort data may be compared to the prior aquatic effort data to generate a predictive suggestion. For example, current temperature, current location, current time, current date, current water condition, and/or current weather conditions may be compared to prior temperature, prior location, prior time, current date, prior water condition, and/or prior weather conditions. This comparison may indicate similarities in the conditions. The similarities may be used to generate a predictive suggestion regarding, for example, a tour to utilize, a position to maintain, a bait to use, a lure to use, a rod to use, a reel to use, etc. The prediction suggestions may change as the current aquatic effort data is obtained to indicate matches to other prior aquatic effort data. Services associated with an aquatic effort may also be updated. For example, perhaps a time of day indicates that the angling hours in the day are almost over. The service may automatically make dinner reservations at a local eatery.

Predictive generation provides many unforeseeable advantages in the angling and scientific world. Trends may be easily identified. Angling suggestions are easily obtained. Tours may be dynamically updated as current aquatic effort data changes. Position maintenance routines may be dynamically updated and services may be dynamically updated according to current aquatic effort data.

In the manner provided herein, aquatic efforts, data collection, aquatic services and watercraft positioning may be automated. Several examples are provided herein below. These examples are not meant for limiting the myriad of possibilities associated with position maintenance, current aquatic effort date, prior aquatic effort data, and predictive generation. These examples are meant to give a few examples of the possible unforeseeable benefits of the features more fully set forth herein.

FIG. 1 represents exemplary network overviews for watercraft anchoring and automation. Network overview 100 may include internet 102 and one or more watercrafts 104, 106 and 108. Watercrafts 104, 106 and 108 are depicted herein for exemplary purposes only. In one aspect, watercrafts 104, 106 and 108 are personal fishing watercrafts and are distinguished from commercial fishing vessels. Watercrafts 104, 106 and 108 may include any combination of network connectivity, number of trolling devices, anchor points, and anchor point tolerances. For example, a watercraft may be connected to the internet via wireless connectivity. Two watercraft may be networked together to exchange information via the internet, a radio frequency, and/or an infrared frequency. A watercraft may have no network connectivity, where features of the disclosure are locally facilitated. In other aspects, a watercraft may use another watercraft to network to the internet or another watercraft in a mesh network manner. These and any of the other myriad of network possibilities may be included to facilitate watercraft automation and aquatic effort data utilization.

Watercraft 104 includes a connection to internet 102 for uploading and downloading data. Watercraft 104 may also be networked to watercraft 106 for direct communication. Watercraft 104 also includes a single tolling device 110 located at the front of watercraft 104. Trolling device 110 may include a trolling motor with an automated speed and directional control mechanism for controlling the trolling device via a remote. Remote control trolling devices and the mechanics associated with remote control trolling devices are generally known in the angling industry. In aspects of the disclosure, trolling device 110 is in communication with a computing device such as the computing device illustrated in FIG. 10 for receiving direction and propelling inputs. Trolling device 110 may be associated with anchor point 112. Anchor point 112 may include an anchor point associated with a GPS device, a relative positioning device, a depth finder device, a sonar device, a gyroscope device, a magnetic compass, etc. Stated another way, anchor point 112 may be associated with any type of device that is functional to identify a position on an aquatic body and determine when the current position of watercraft 104 has moved from the identified position. Anchor point 112 may also have an associated tolerance 114. Tolerance 114 may indicate a distance from anchor point 112 that watercraft 104 may drift before a position maintenance routine is actuated. Tolerance 114 may include "no" tolerance, meaning that the current position is maintained at anchor point 112 and deviation from the anchor point 112 will actuate the position maintenance routine. Tolerance 114 may also be a drift tolerance. Stated another way, tolerance 114 may allow drift from anchor point 112 at a rate. In operation, a computing device associated with watercraft 104 downloads and uploads data from internet 102 and/or watercraft 106. Anchor point 112 is set and trolling device 110 is controlled to maintain trolling device 110 within tolerance 114. In aspects associated with watercraft 104, the rear portion of watercraft 104 may drift relative to the front portion of watercraft 104.

Watercraft 106 is similar to watercraft 104, but watercraft 106 includes two trolling devices and two anchor points are set with two tolerances. Watercraft 106 may be networked with the internet, watercraft 104, and watercraft 108. In operation, a computing device associated with watercraft 106 downloads and uploads data from internet 102 and/or watercraft 104 and/or watercraft 108. Anchor points 112 are set and trolling devices 110 are controlled to maintain trolling devices 110 within tolerances 114. In aspects associated with watercraft 106, the rear portion of watercraft 106 and a front portion of watercraft 106 may be maintained or moved relative to one another. Accordingly, watercraft 106 may be automatically controlled to switch anchor points 112 and cause watercraft 106 to spin. Watercraft 106 may also move sideways. Also, the rear portion of watercraft 106 may be maintained relative to the front portion of watercraft 106 so that no portion of watercraft 106 drifts from wind or wave action. In other aspects, watercraft 106 may be controlled to drift at a controlled rate relative to a current and/or current direction.

Watercraft 108 is similar to watercraft 104, but watercraft 108 includes trolling device 110 located in the center portion of watercraft 108. Also, watercraft 108 is not directly connected to internet 102. In one aspect, watercraft 108 may include a direct network connection to watercraft 106. In such a situation, watercraft 108 may communicate with watercraft 106, and watercraft 108 may use watercraft 106 as a network node to communicate with watercraft 104 and/or internet 102. In aspects associated with watercraft 108, position maintenance data associated with the control of watercraft 108 may be stored locally and not publicly shared. In other aspects, data is maintained on a local storage device such as a CD-ROM, a hard drive or an external storage device. Data may be uploaded, downloaded, and/or synchronized before and after an aquatic effort if desired. Even though three watercraft scenarios are depicted in FIG. 1, any combination may exist. Watercrafts may include any level of connectivity to a network, any number of trolling devices, and any location of trolling devices. As another example, the network may include a closed network between a few anglers and/or a network that includes a password protected group of anglers. Even though not depicted in FIG. 1, certain aspects of the disclosure are relevant to anchor a watercraft with a weighted anchor. These features are further highlighted herein.

Figure 2:
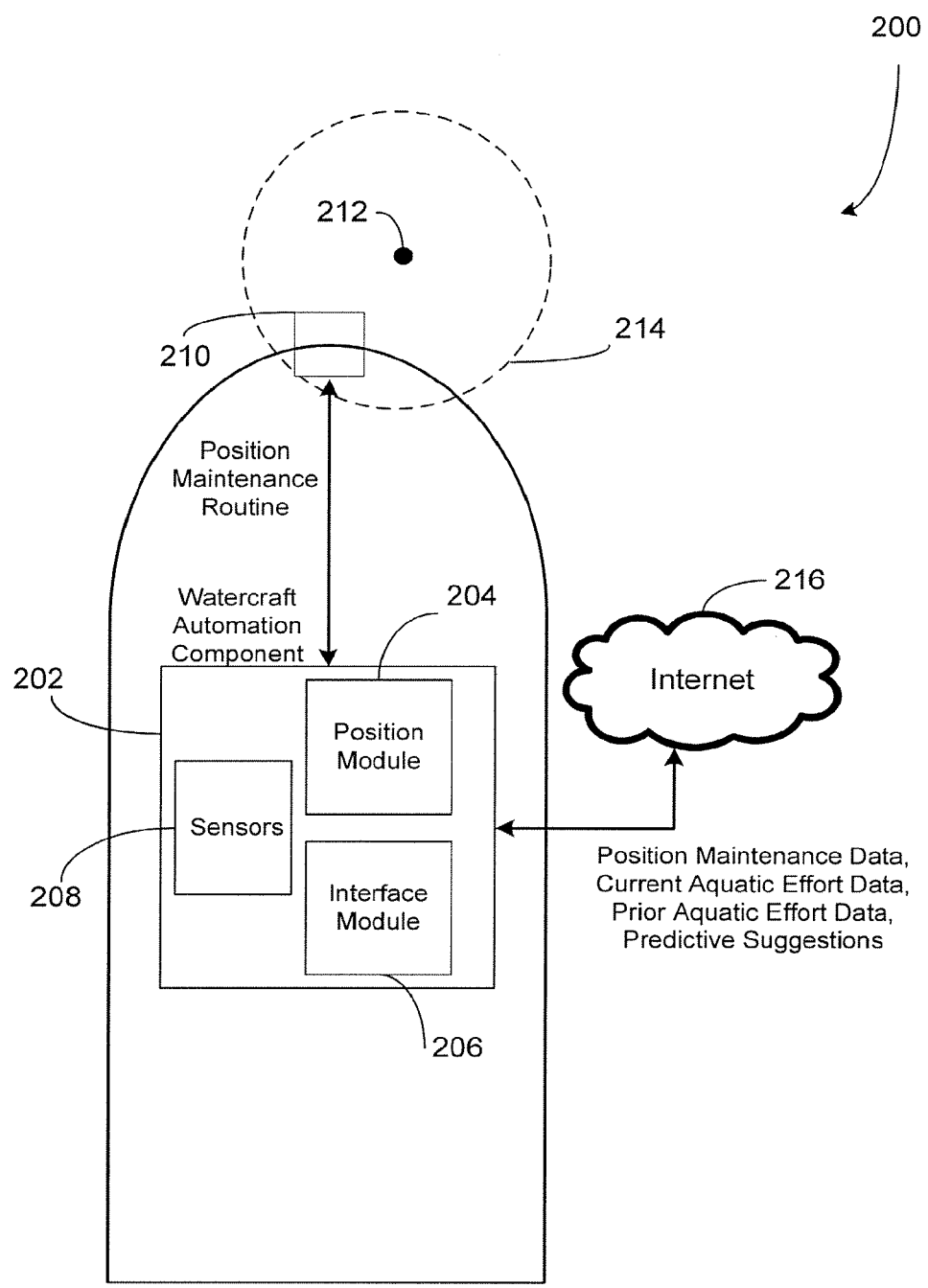
FIG. 2 represents one example system overview for watercraft anchoring and automation.

FIG. 2 represents one example system overview for watercraft anchoring and automation. System overview 200 represents a modular overview of some features of the disclosure. System overview 200 may be integrated as a combination of software and hardware elements, an operating system or any combination thereof. Hardware, databases, software or applications referenced herein may be integrated as a single feature or include various features in communication with one another. Software and/or hardware elements are depicted herein for explanatory purposes only and not for limiting the configuration to multiple elements or a single element performing several functions. For example, in FIG. 2, watercraft automation component 202 may include a position module 204, interface module 206 and sensors 208. Reference numbers 202-208 may include separate programs, separate databases and separate hardware. Reference numbers 202-208 may also include a single program or any combination of single and multiple programs.

Figure 10:
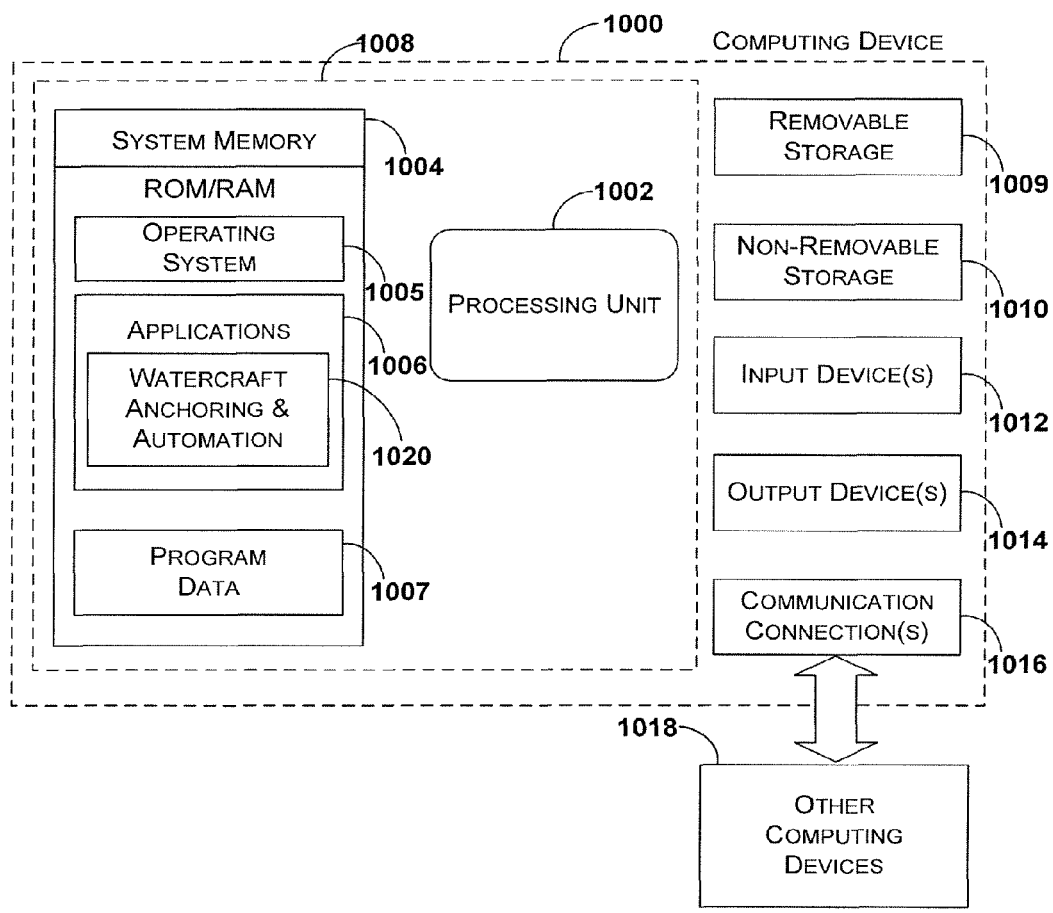
FIG. 10 represents an exemplary computing device.

Watercraft automation component 202 and associated components 204-208 may include computing device 1000 as exemplified in FIG. 10. Watercraft automation component 202 may include a telephone, cellular telephone, satellite telephone, stationary computing device, mobile computing device, televising device, mobile audio device, watch device, or any other device that may implement watercraft automation as set forth herein. In one aspect, watercraft automation component 202 is depicted to show a physical device with components 204-208 integrated thereon. In another aspect, watercraft automation component 202 is depicted to show a communication association between components 204-208.

Watercraft automation component 202 communicates with trolling device 210 to facilitate setting anchor point 212 and tolerance 214. Watercraft automation component 202 may also be in communication with internet 216 to communicate position maintenance data, current aquatic effort data, prior aquatic effort data, services, predictive suggestions and/or the like. In other aspects, the watercraft automation component 202 is in communication with an open network, a closed network, a password protected network, and/or an internet site having group privileges. In other aspects, watercraft automation component 202 may communicate with a local storage and local programs. In still other aspects, watercraft automation component 202 communicates with other watercrafts. Watercraft automation component 202 may also receive data associated with sensor 208 and interface module 206. As more fully set forth below, watercraft automation component 202 determines a proper position maintenance routine for trolling device 210, uploads and downloads appropriate date from internet 216 (or a local storage), and receives and displays appropriate data on interface module 206.

Position module 204 may include a GPS device, a relative positioning device, a depth finder device, a gyroscope device, a magnetic compass device, a sonar device, etc. Stated another way, position module 204 may be associated with any type of device that is functional to identify a position on an aquatic body and determine when the current position of a watercraft has moved from the identified position. In other aspects, position module 204 determines a rate of drift from anchor point 212. In one aspect, position module 204 may identify a current position and communicate the current position to watercraft automation component 202 to determine whether the current position is within a tolerance of anchor point 212. In other aspects, position module 204 includes instructions to determine whether the current position is within a tolerance of anchor point 212.

Sensors 208 may include a plurality of different sensor types, of which a few are described herein. The sensor data may be communicated to watercraft automation component 202 to thereby update a position maintenance routine, position module 204, storage, interface module 206, and/or storage associated with internet 216. In one aspect, sensors may include an environmental sensor. Environmental sensors may include a weather sensor, a temperature sensor, a water depth sensor, a temperature sensor, a water sensor, a water flow sensor, a barometric sensor, a wind sensor, a rain gage, a water quality sensor, an air quality sensor, and/or any other type of sensor for determining environmental conditions. Sensor may also include watercraft sensors. Watercraft sensors may include a fuel sensor, oil sensor, battery sensor, a watercraft drift sensor, a GPS sensor, and/or any other type of sensor for determining conditions of a watercraft. In other aspects, a sensor may be associated with a downrigger. The downrigger sensor may include a dept sensor, water temperature sensor, ph sensor, water clarity sensor, and/or any other sensor type described herein. In this manner, data associated with a water depth may be obtained. A sensor may also include a radio frequency identifier (RFID) sensor. Such sensors may be configured to detect RFID tags associated with aquatic life, a lure, a reel, a rod and/or any other equipment associated with an aquatic experience. The RFID sensor may be used to quickly and efficiently log and store data. For example, an RFID tag may be associated with a lure and encoded with data that indicates the lure weight, type, size, shape, category, color, etc. In one aspect, the RFID tag is imbedded in the head of the lure and balanced to provide proper movement as the lure travels through the water. A sensor may also include a bar code reader. The bar code reader may detect a bar code associated with a lure, a reel, a rod and/or any other equipment associated with an aquatic experience. The bar code reader may be used to quickly and efficiently log and store data. Sensors may also include trolling sensors. Trolling sensors may detect a direction, a propelling direction, a propelling speed, and the like. A myriad of other sensors may be associated with the watercraft in order to detect current conditions associated with an aquatic experience.

Interface module 206 may include aspects of computing device 1000 illustrated in FIG. 10. Interface module 206 may include a display and input device. Such input devices may include a touch screen, an electronic pen, a mouse device, a keyboard, and any other type of input device for inputting and/or displaying data. Interface module 206 is configured to receive inputs from a user and communicate data to a user. In other aspects, interface module 206 communicates with sensors 208, position module 204, internet 216, watercraft automation component 202, and/or trolling device 210. For example, interface module 206 may display data associated with FIG. 4. Interface module 206 may also receive input data and associate the input data with watercraft automation component 202. Watercraft automation may then update storage, interface module 206, a position maintenance routine and/or storage associated with interne 216.

Watercraft automation component 202 is configured to communicate data with internet 216. In the situation where watercraft automation component 202 is not associated with internet 216, watercraft automation component 202 may be configured to communicate with a local storage. In other aspects, watercraft automation component 202 initially uploads data from the internet before an aquatic effort. Data is updated to a local storage during an aquatic effort and data is updated to internet 216 after an aquatic effort. The data may be dynamically and automatically synchronized during an aquatic effort in other aspects of the disclosure. In some aspects, data is locally maintained and not uploaded to internet 216. This may occur when an angler desires keeping angling secrets from other anglers.

The data communicated between watercraft automation component 202 and internet 216 (network, or a local storage if the watercraft automation component 202 is not networked) may include position maintenance data. Position maintenance data may be automatically generated by control of the troller and/or position maintenance data may be input by a user. The position maintenance data may include anchor point data. The anchor point data may include a name of an anchor point, an identifier of an anchor point, directions associated with an anchor point, mapping data associated with an anchor point, etc. The position maintenance data may further include an anchor point identifier. The anchor point identifier may be an identifier for identifying a "container" for storing aquatic effort data in association with the anchor point. In another aspect, the identifier may be associated with a new container for data. In still another aspect the anchor point may include an anchor point apart from the anchor point that is maintaining the position of the watercraft. In one aspect, the identifier is a GPS coordinate. However, the anchor point identifier may also include an identifier associated with a depth finder, a relative position, a sonar position, a gyroscopic position, a magnetic compass position, an imagery position or any other type of identifier that is used for marking a position. Position maintenance data may further include anchor point duration data. Stated another way, the time, date and duration of maintaining the watercraft in association with an anchor point. Such duration data may be relevant in determining an amount of time an angler is anchored at a position and comparing the duration against a quantity of aquatic life caught. The position maintenance data may also include data associated with the tolerance of the anchor point. For example, the tolerance may include a distance tolerance, no tolerance, and the like. Other tolerances may include a drift rate tolerance The data communicated between watercraft automation component 202 and internet 216 (network, or a local storage if the watercraft automation component 202 is not networked) may also include prior aquatic effort data. Prior aquatic effort data includes data that is association with a data container identified by an anchor point identifier. The prior aquatic effort data may include data from prior angling experiences, data from a tour service and/or any other type of data that may have been associated with an anchor point identifier prior to a current angling experience. For example, prior aquatic effort data may include prior environmental data associated with an anchor point. Prior aquatic effort data may include position maintenance data associated with a prior tour or with a prior angling experience. Prior aquatic effort data may include blog and/or graffiti data associated with prior experiences at the anchor point. Blog and/or graffiti data may include text, video streams, maps, satellite imagery and/or photographs. Internet services may also be included in the prior aquatic effort data. Such internet services may include prior services used during a virtual tour or angling experience. Internet services may include mapping services, laws, angling rules, angling limits, restaurants and hotels within proximity, emergency services, water discharge data, weather report data, dam reports, moon phase reports, tide predictions and/or the like. In other aspects, prior aquatic effort data may include river data, water elevation data, data from a government agency, water discharge data, etc. Prior aquatic effort data may further include prior caught aquatic life type data and prior aquatic quantity data. For example, a fish type and a quantity of fish from a prior experience may be obtained in association with an anchor point identifier. Similarly, prior aquatic effort data may include a bait type, a lure type, a rod type, a reel type, and the like. The data may be from a prior experience and may be obtained in association with an anchor point.

The data communicated between watercraft automation component 202 and Internet 216 (or a local storage if the watercraft automation component 202 is not networked) may also include current aquatic effort data. Current aquatic effort data may include automatically generated data (e.g. data from sensors or the control of the watercraft) and/or the data may include user input data. The current aquatic effort data may be associated with the data container identified by the anchor point identifier. Current aquatic effort data may include data collected from sensors. Current aquatic effort data may also include data collected from a position maintenance routine. Position maintenance data may include the duration of maintaining an anchor point. The position maintenance data may also include data associated with the directional control of the troller (e.g. compass directions, relative direction, etc). Current aquatic effort data may include RFID data. For example, an RFID sensor may detect an RFID tag that is associated with a lure, rod, reel, and/or aquatic life. The RFID tag may be encoded with information that indicates a type, date, etc. Similarly, the current aquatic effort data may include barcode reader data. For example, a barcode reader may detect a bar code that is associated with a lure, rod, reel, and the like. The bar code may be encoded with information that indicates a type, date, etc. In other aspects, current aquatic data may include a type and number of aquatic life caught. Such data may be manually entered into a user interface and/or detected by an RFID tag associated with the aquatic life. In other aspects, a scale sensor is associated with watercraft automation component 202 and the weight of the aquatic life is automatically associated with watercraft automation component 202 upon associating the aquatic life with the scale sensor.

Current aquatic effort data may further include data that is associated with a virtual tour. For example, as an angler navigates a virtual tour, data may be obtained. Data may include duration of the tour, success on the tour, comments associated with the tour, and/or other information that describes the angling tour. Current aquatic effort data may further include blog data and graffiti data (e.g. text data, video data, and/or picture data). Blog data and graffiti data may be comments entered by an angler regarding a particular angling location. The comments may be associated with an angler's blog and/or posted as graffiti in association with the data container of the anchor point identifier. The current aquatic effort data may further include internet services. For example, internet services may be communicated that provide services associated with the anchor point identifier. Such services may include mapping services, laws, angling rules, angling limits, restaurants and hotels within proximity, emergency services, dam reports, water discharge reports, government agency reports, moon phase reports, tide predictions, weather reports, lake reports, ocean reports and/or the like.

Current aquatic effort data may further include aquatic life type data and aquatic quantity data. For example, a fish type and a quantity of fish may be input or detected for association with an anchor point identifier. Similarly, current aquatic effort data may include a bait type, a lure type, a rod type, a reel type, and the like. The data may be input by a user and/or detected via a sensor.

The data communicated between watercraft automation component 202 and internet 216 (or a local storage if the watercraft automation component 202 is not networked) may further include predictive suggestions. Predictive suggestions are generated by comparing the current aquatic effort data associated with an anchor point to prior aquatic effort data association with an anchor point. In other aspects where prior aquatic effort data is not associated with an anchor point, the current aquatic effort data may be used to make generalized or default predictive suggestions in regard to the anchor point. As an example, current aquatic effort data may indicate that no fish have been caught with lure X for the last twenty minutes. Past aquatic effort data for prior tours may indicate that when lure X does not work, lure Y has worked in the past in association with an anchor point. Accordingly, the interface will populate with a suggestion to switch to lure Y. In such a manner, predictive suggestions may include position maintenance data. The position maintenance data may be generated from a comparison of current aquatic effort data to prior aquatic effort data and indicate a position to maintain that has been successful in the past under the current conditions. In such situations, a watercraft may be automatically navigated to a new anchor point.

Predictive suggestions data may include virtual tour data. The virtual tour data may suggest a detour from a current tour by comparing the current aquatic effort data to the prior aquatic effort data and indicating a detour that has been successful in the past under the current conditions. Similarly, predictive suggestions data may include bait type data, lure type data, rod type data, and reel type data. A comparison is made between the current aquatic effort data and the prior aquatic effort data to make a predictive suggestion that has been successful in the past under the current conditions. The comparison may include a range of matching values. As an example, a current water temperature may be 80 degrees. The predictive suggestion may find that at 75 degrees a certain lure has been successful in the past. Accordingly, the predictive suggestion data may give an indication to switch to the certain lure. In a similar manner, ranges may be set for the date, time of day, sensor data, and the like.

Other predictive suggestions may be associated with services. For example, the current aquatic effort data may indicate that ten fish have been caught. A service may indicate that ten fish is a limit for the lake. The current fish caught is compared to the limit of the service and a predictive generation is created. In this example, the predictive generation may include data that states that the angler has reached a limit and whether to confirm dinner reservations at a local restaurant. In other aspects, the watercraft may be controlled via predictive suggestions. For example, when current aquatic effort data is compared to prior aquatic effort data, a predictive suggestion may indicate that a new anchor point should be maintained. In such a situation, watercraft automation component 202 automatically controls the troller to navigate to a new anchor point.

The disclosure herein includes a few examples of predictive generation and automation from predictive generation. A myriad of possibilities exist when current aquatic effort data associated with an anchor point is compared to prior aquatic effort data of an anchor point. In one aspect, the anchor point is associated with a weighted anchor. However, in other aspects the anchor point is associated with a position maintenance routine of a trolling device. By associating the anchor point with a position maintenance routine, the position maintenance routine may be dynamically updated to control the trolling device in light of current aquatic effort data, prior aquatic effort data and predictive suggestion data.

Figure 3:
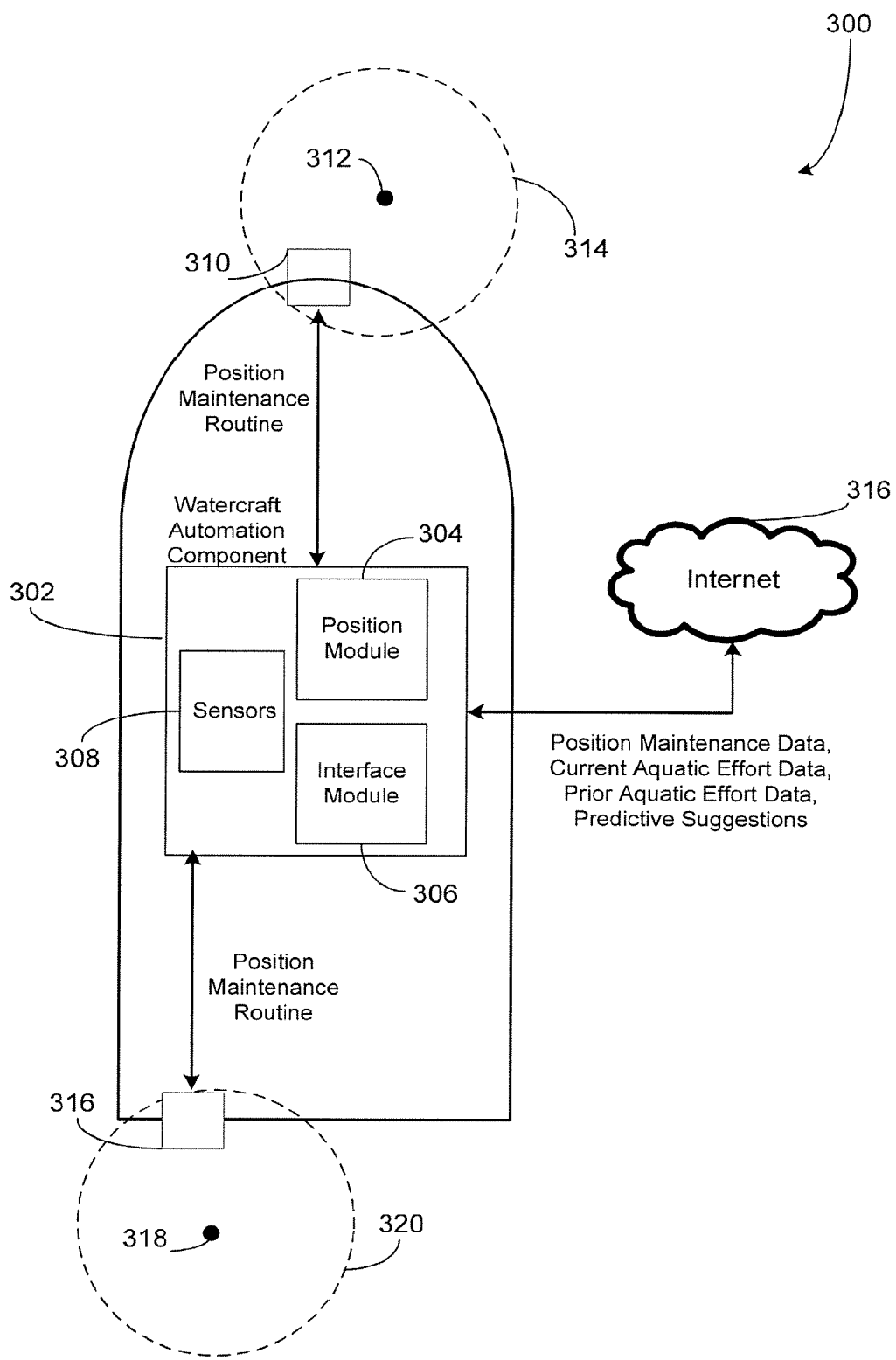
FIG. 3 represents one example system overview for watercraft anchoring and automation.

FIG. 3 represents one example system overview for watercraft anchoring and automation. System overview 300 represents a modular overview of some features of the disclosure. System overview 300 is similar to system overview 200 except system overview 300 includes two trolling devices, two position maintenance routines, two anchor points and two tolerances. As such, the front and the rear of the watercraft may be more precisely controlled with respect to one another and provide for a richer experience during an aquatic tour. System overview 300 includes watercraft automation component 302, position module 304, interface component 306, sensors 308, trolling device 310, anchor point 312, tolerance 314 and internet 316. System overview 300 also includes second trolling device 316, second anchor point 318 and second tolerance 320. Elements 316-320 may be implemented in a similar manner as elements 310-314.

In one aspect, even though two anchor points are depicted, a single anchor point identifier (e.g. either anchor point 312 or anchor point 318) may be utilized for identifying a container for associating data with a position. In system overview 300, trolling device 310 may be controlled relative to trolling device 316. For example, the front of the watercraft may be moved relative to the rear of the watercraft. As another example, trolling device 310 may be controlled to switch anchor points with trolling device 316 to cause the watercraft to rotate 90 degrees. Such a movement may be useful when an aquatic tour includes both sides of the watercraft. By rotating the watercraft, an angler may be easily directed to the position where the tour data indicates to cast. In other aspects, trolling device 310 and trolling device 316 may be controlled to "shift" the boat sideways. Such a movement is useful when pulling up to a dock, etc. In other aspects, the watercraft may be maintained perpendicular to a current flow of a river and drift at a rate that is more or less than the current of the river.

Figure 4:
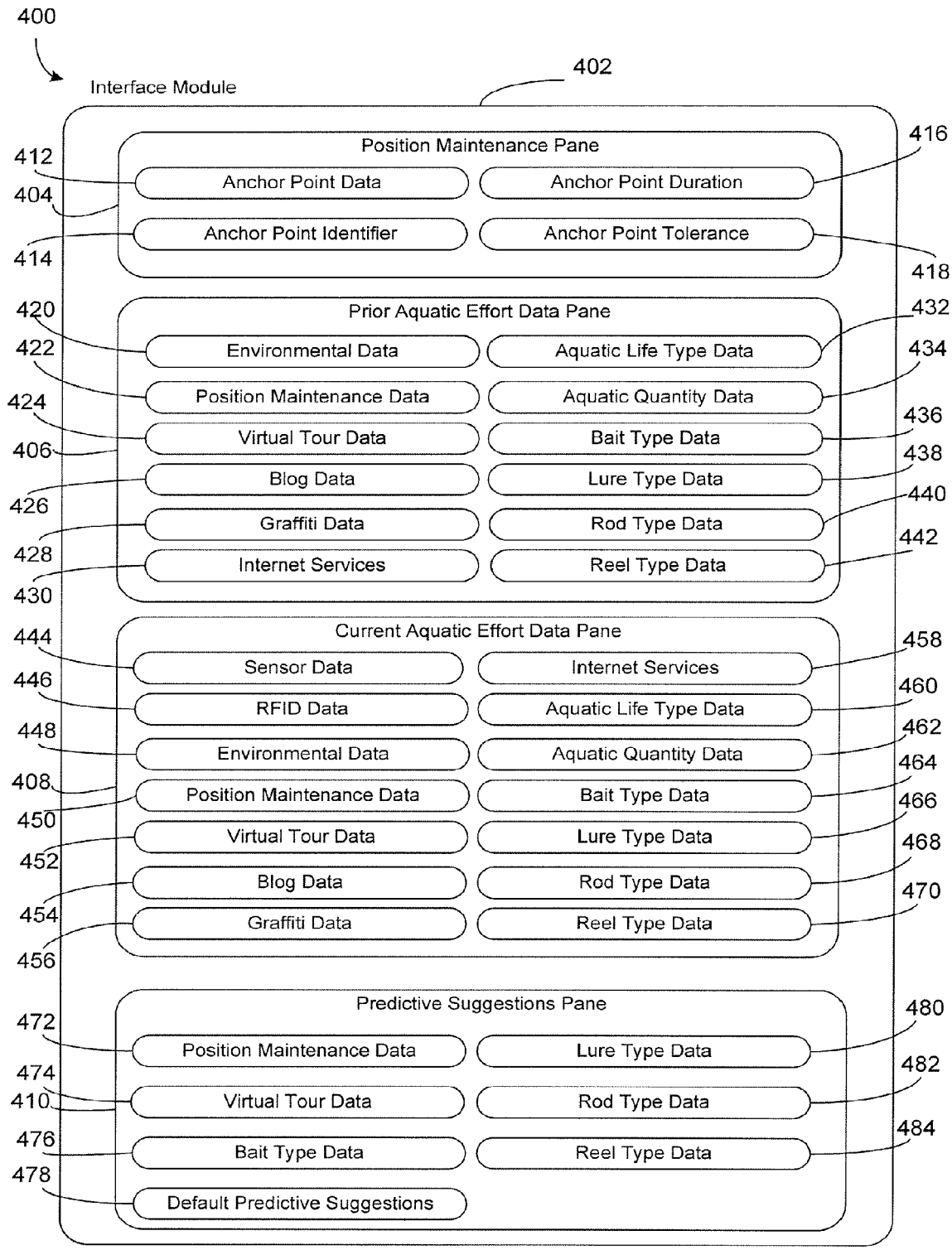
FIG. 4 represents one example interface for watercraft anchoring and automation.

FIG. 4 represents one example interface for watercraft anchoring and automation. Interface 400 may include display 402 having one or more generated panes. Interface 400 may include position maintenance pane 404, prior aquatic effort data pane 406, current aquatic effort data pane 408, and predictive suggestions pane 410. Panes 404-410 may include data, controls, fields and tools. As an example, interface 400 may include displayed data for use by an angler. Interface 400 may include controls for controlling a trolling device, sensors, internet connection, position module, etc. Interface 400 may also include fields for entering data associated with the position maintenance routine, prior aquatic effort data, current aquatic effort data and/or predictive suggestions. Interface 400 may also various tools for managing data and controls associated with the features set forth herein. Interface 400 includes several sub-panes for exemplifying some of the features of interface 400. Position maintenance pane 404 may include data, controls, features and tools associated with anchor point data 412, anchor point identifier data 414, anchor point duration data 416 and anchor point tolerance data 418. Prior aquatic effort data pane 406 may include data, controls, features and tools associated with environmental data 420, position maintenance data 422, virtual tour data 424, blog data 426, graffiti data 428, internet services 430, aquatic life type data 432, aquatic quantity data 434, bait type data 436, lure type data 438, rod type data 440, and reel type data 442. Current aquatic effort data pane 408 may include data controls, features and tools associated with sensor data 444, RFID data 446, environmental data 448, position maintenance data 450, virtual tour data 452, blog data 454, graffiti data 456, internet services 458, aquatic life type data 460, aquatic quantity data 462, bait type data 464, lure type data 466, rod type data 468 and reel type data 470. Predictive suggestions pane 410 may include data, suggestions, predictions, controls, features and tools associated with position maintenance data 472, virtual tour data 474, bait type data 476, default predictive suggestions 478, lure type data 480, rod type data 482, and reel type data 484.

Figure 5:
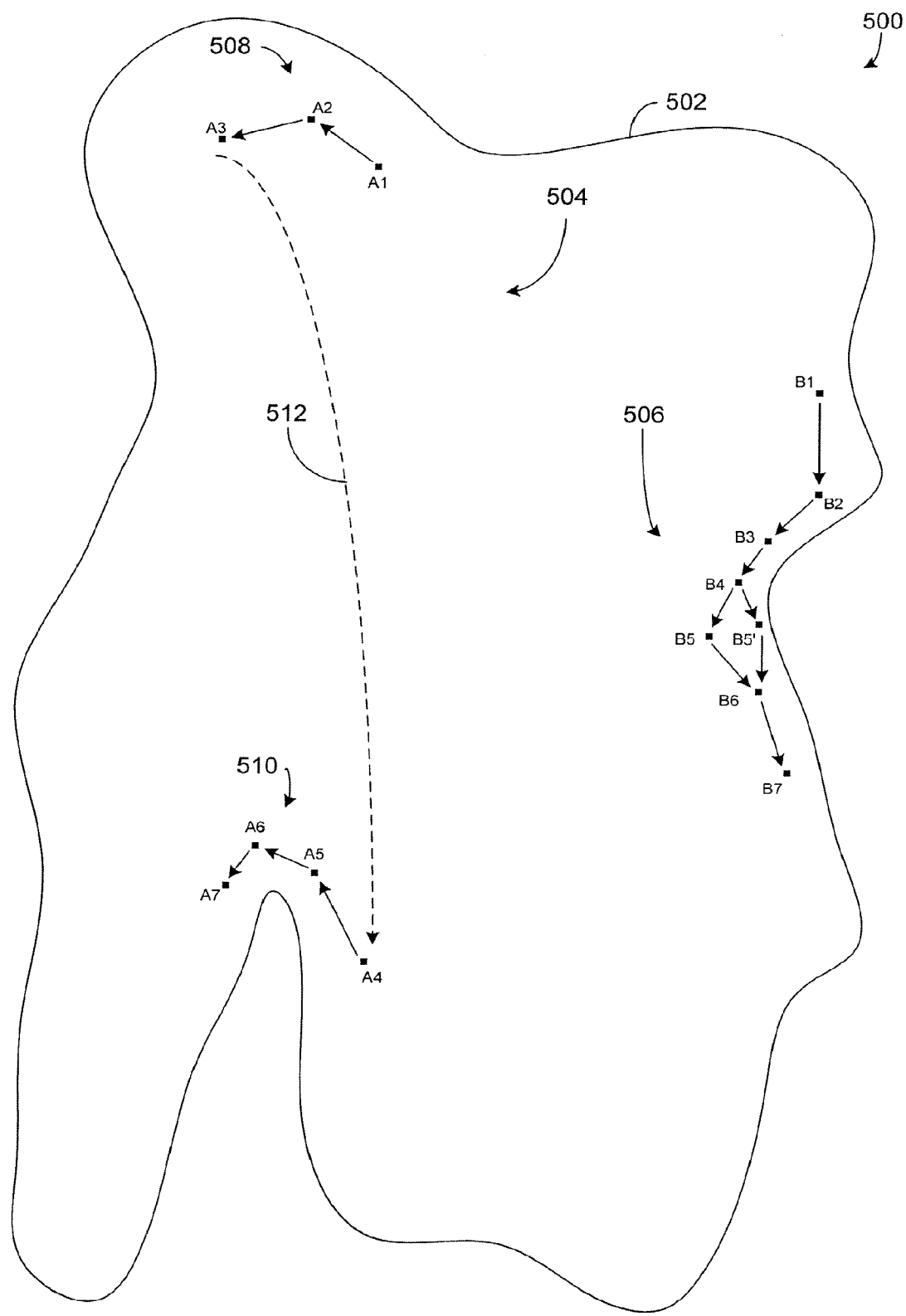
FIG. 5 represents one example of tours for watercraft anchoring and automation.

FIG. 5 represents one example of a tour for watercraft anchoring and automation. Exemplary tour overview 500 includes a lake edge 502, a first tour 504 and a second tour 506. A tour may include a user generated tour, a tour downloaded from the internet, a tour associated with a removable computer-readable storage medium, and/or a "live" tour that is automatically updatable from a network. First tour 504 includes a first leg 508, a second leg 510 and transport leg 512. Second tour 506 shows a tour with a possible detour route. First tour 504 and second tour 506 depict a few tour examples associated with the disclosure. A myriad of tours are possible in light of the disclosure.

As an example in association with first tour 504, an angler may enter an aquatic body somewhere near anchor point A1 First tour 504 may be associated with a watercraft automation module. Upon receiving a "start tour" command, a trolling device may detect a current position and compare the current position to the position of anchor point A1. The watercraft automation module controls the trolling device to propel the watercraft from the current position to anchor point A1. At anchor point A1, an angler has entered first leg 508. The tour associated with anchor point A1 may also include an anchor point duration associated with anchor point A1. Accordingly, a position maintenance routine may maintain the watercraft at anchor point A1 until the anchor point duration has expired. At such expiration, the watercraft is propelled from anchor point A1 to anchor point A2. At any time during the tour, the control of the watercraft according to the tour may be modified. For example, an angler may override the tour to instigate a forced detour or frolic from the tour. In other situations, the current aquatic effort data, prior aquatic effort data and/or prediction suggestion may modify the tour from the tour as initially set.

Transport leg 512 is indicated between anchor point A3 and anchor point A4. When the anchor point duration association with anchor point A3 expires, the first tour 504 may enter a transport mode. The transport mode may be actuated when the distance between anchor points is too far for a trolling device to efficiently navigate. An example criteria may include a 1 mile distance between anchor points actuates a transport mode. When the watercraft automation module is in a transport mode, a mapping program may populate the interface to navigate an angler to a distal anchor point via a high horse power motor. Stated another way, transport mode may indicate that the watercraft cannot be automatically navigated to the next anchor point. At anchor point A4, an angler has begun second leg 510 of first tour 504. The watercraft automation module then automatically navigates the watercraft and maintains the watercraft at anchor points A4-A7.

Second tour 506 may depict a tour with a detour or frolic. In another aspect, second tour 506 may depict a tour on a river. With regard to a detour, the watercraft automation module may control a trolling device to navigate a watercraft to anchor point B4. As an example of a detour, at anchor point B4, the water temperature may increase several degrees and a sensor may indicate that the angler is catching more fish at the higher temperature. The tour may indicate a detour to anchor point B5' as opposed to anchor point B5. A prediction may indicate that anchor point B5 is deeper in the lake and therefore the water will be cooler than the more shallow anchor point B5'. Second tour 506 may automatically cause the watercraft automation module to navigate the watercraft to anchor point B5'. In other aspects, the detour may be suggested and accepted or denied by a user input. As illustrated in the above example, the tour is dynamically modified according to current conditions of the tour. The tour may also be modified by comparing current conditions of the tour to past conditions of the tour. As such, the watercraft automation module puts an angler in the best position for success.

As another example, second tour 506 may represent a tour along a river. Anchor points B1-B7 may represent a path associated with the current flow along a river. When transitioning from anchor point B1-B2, a position maintenance routine may cause a controlled drift. Many times when angling a river, an angler desires a controlled drift in the direction of the current. Sometimes the current is too rapid for angling at the rate of the current. Accordingly, a controlled drift may be instigated to allow the watercraft to drift at a slower rate then the current of the river. In doing so, a position module may detect a current position of a watercraft and a relative speed of the watercraft. The relative speed of the watercraft may be detected through a water current sensor or by detecting the distant change over a time interval associated with an anchor point. Once the relative speed of the watercraft is detected, the trolling device may be controlled by the watercraft actuation module to reduce or increase a drift. As an example, the river current speed may be seven miles an hour. In the situation where the angler desires a two mile an hour drift, the watercraft is automatically propelled against the current at a rate of five miles an hour. As another example, the speed of the river current may be one mile an hour. In the situation where the angler desires a 5 mile an hour drift, the watercraft is automatically propelled with the current at a rate of four miles an hour. The same principles may be implemented for drift associated with the wind or wave action. FIG. 5 represents a few examples associated with anchor points, tours, legs, transport legs, detours, frolics and drift. Other combinations of tours exist and FIG. 5 should not be read as limiting but as a few examples.

Figure 6:
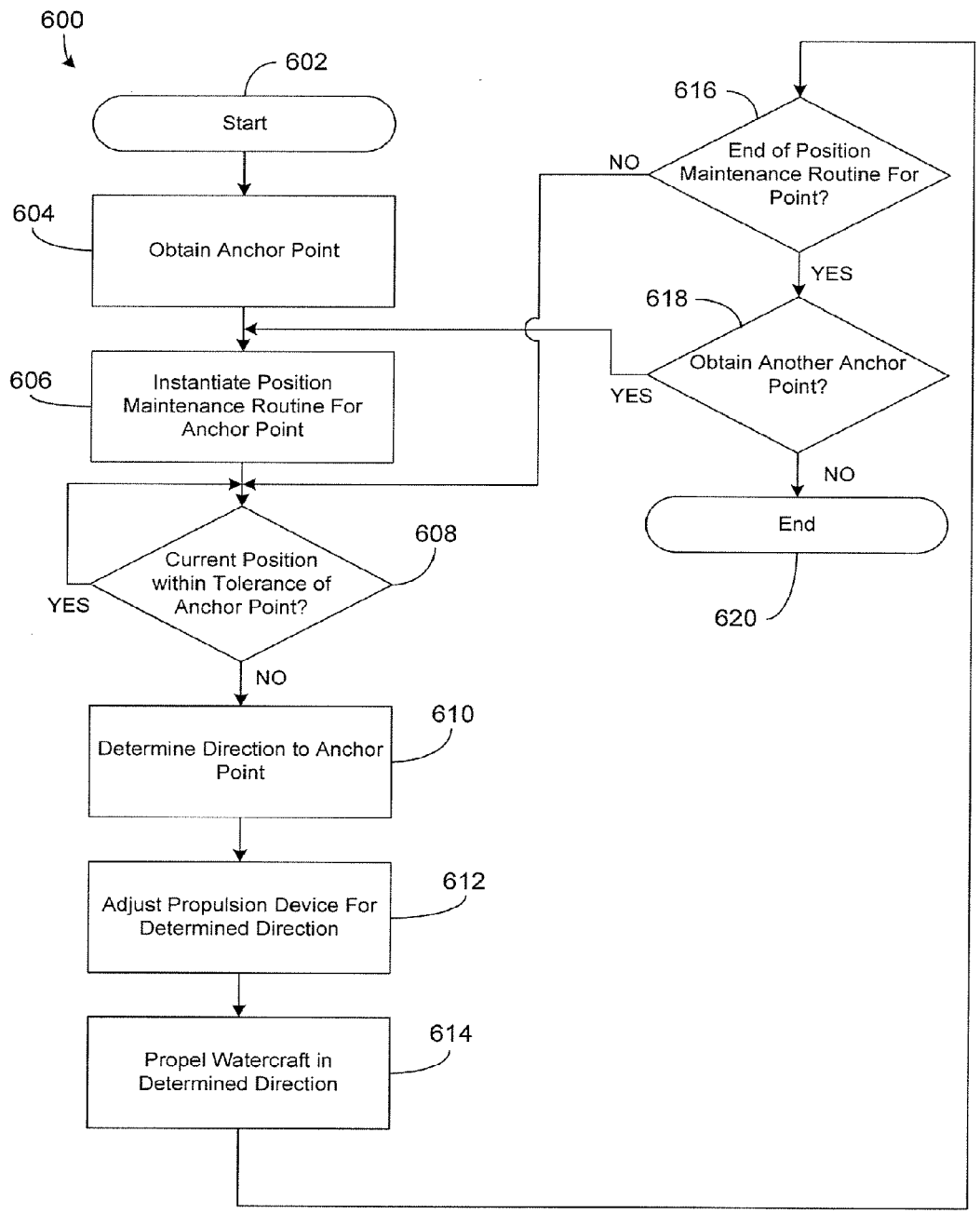
FIG. 6 represents one exemplary operational flow diagram for obtaining and maintaining an anchor position.

FIG. 6 represents one exemplary operational flow diagram for setting and maintaining an anchor position. Operational flow 600 begins at start operation 602 and continues to operation 604 where an anchor point is obtained. An anchor point may include an identifier such as a directional coordinate, a map coordinate, a GPS identifier and the like. The anchor point may be obtained by a user selection. For example, a user may select a "set anchor" actuator on a display. In such a situation, a GPS coordinate may be received and the anchor point is set to the GPS coordinate. In other situations, an anchor point may be obtained from an internet service, such as a tour service. An anchor point may also be a stored anchor point and obtained from a local storage or a removable storage device. In yet another example, an anchor point may be obtained from another watercraft via a network, the internet, a radio frequency, infrared frequency or the like.

After the anchor point is obtained, operational flow 600 continues to operation 606 where a position maintenance routine for the anchor point is instantiated. The position maintenance routine may be automatically instantiated in association with a tour. In other aspects, a user may instantiate a position maintenance routine by selecting an object of the user interface. The position maintenance routine may maintain the watercraft within a tolerance of an anchor point. In another aspect, the position maintenance routine maintains a drift rate away from the anchor point.

Operational flow 600 continues to decision operation 608 where it is determined whether the current position is within a tolerance of the anchor point. The tolerance may include a rate of change tolerance associated with drift. In other aspects, the tolerance includes a static position tolerance. The tolerance may also include "no" tolerance. In one aspect, at decision operation 608, the current position of the watercraft is detected. For example, the current position may be detected via GPS. If the current position is within the tolerance of the anchor point, operational flow 600 loops back up until the current position is not within the tolerance of the anchor point. Operational flow 600 continues to operation 610 when the current position of the watercraft is not within the tolerance of the anchor point. In another aspect, at decision operation 608, speed of the watercraft relative to the anchor point is determined. When the speed of the watercraft relative to the anchor point is within the tolerance of the anchor point, operational flow 600 loops back up until the speed of the watercraft relative to the anchor point is not within the tolerance of the anchor point. When the speed of the watercraft relative to the anchor point is not within the tolerance of the anchor point, operational flow 600 continues to operation 610.

At operation 610, the direction to the anchor point is determined. The direction may include a compass direction, GPS directions, radial coordinate directions, rectangular coordinate directions and the like. As an example, the current position may be compared to an anchor position and it may be determined that the anchor point is in the north east direction. Continuing to operation 612, the propulsion device is adjusted for the determined direction. The propulsion device may be automatically rotated so that when the propulsion device is actuated it propels the watercraft in the determined direction of the anchor point.

At operation 614, propulsion device is automatically actuated to propel the watercraft in the determined direction. In one aspect, propelling continues until the current position of the watercraft is equal to the anchor point. In another aspect, propelling continues until the current position of the watercraft is within the tolerance of the anchor point. In yet another aspect, propelling continues to maintain a rate of drift from the anchor point.

Operational flow 600 continues to decision operation 616 where it is decided whether to end the position maintenance routine for the anchor point. In one aspect, a position maintenance routine is terminated by a user selection. In another aspect, a position maintenance routine is terminated automatically in association with a tour. In yet another aspect, a position maintenance routine is terminated as dictated by current aquatic effort data, prior aquatic effort data, and/or prediction suggestion data. In still another aspect, a position maintenance routine is terminated by the ending of an anchor point duration. When the end of the position maintenance routine for the anchor point is not reached, operational flow 600 continues to decision operation 608 as set forth above. When the end of the position maintenance routine is reached, operational flow 600 continues to decision operation 618 where it is determined whether to obtain another anchor point. When it is determined to obtain another anchor point, operational flow 600 continues to decision operation 606. When it is determined not to obtain another anchor point, operational flow continues to end operation 620.

Figure 7:
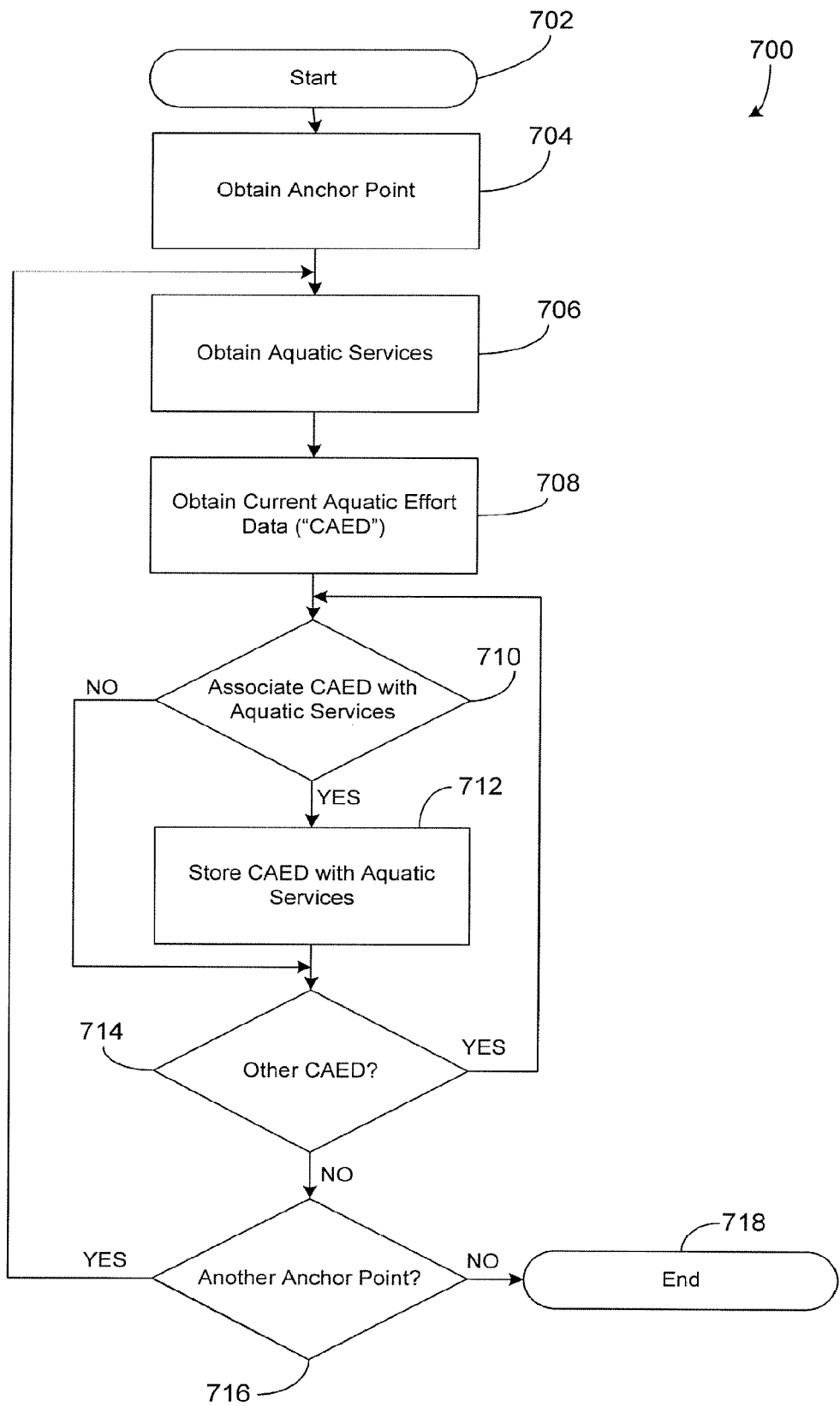
FIG. 7 represents one exemplary operational flow diagram for obtaining current aquatic effort data.

FIG. 7 represents one exemplary operational flow diagram for obtaining current aquatic effort data. Operational flow 700 begins at start operation 702 and continues to operation 704. At operation 704, an anchor point is obtained. An anchor point may include an identifier such as a directional coordinate, a map coordinate a GPS identifier and the like. The anchor point may be obtained by a user selection. For example, a user may select a "set anchor" actuator on a display. In such a situation, a GPS coordinate may be received and the anchor point is set to the GPS coordinate. In other situations, an anchor point may be obtained from an internet service, such as a tour service. An anchor point may also be a stored anchor point and obtained from a local storage or a removable storage device. In yet another example, an anchor point may be obtained from another watercraft via a network, the internet, a radio frequency, infrared frequency or the like.

Operational flow 700 continues to operation 706 where aquatic services are obtained. Aquatic services may be associated with an internet server, locally stored on a computing device and/or associated with a removable computer-readable storage medium. To obtain the services, the identifier associated with the obtained anchor point is matched to aquatic services. For example, services may be identified by a GPS coordinate. When the GPS identifier of the anchor point matches the GPS coordinate (or the GPS coordinate within a range of coordinates), the matched services are populated on the interface of the watercraft. Aquatic services may also include default services that are populated regardless of the anchor point identifier. For example, an emergency call button, a help button and/or the like may populate on the interface regardless of the location of the anchor point. In other situations, the aquatic services may be identified by a range of positions. For example, aquatic services may be associated with an upper quarter of an aquatic body. When the anchor point identifier indicates that the anchor point is within the upper quarter of an aquatic body, aquatic services for the upper quarter of the aquatic body are populated on the user interface of the watercraft.

Interface 400 in FIG. 4 is one example of some aquatic services. As a few examples, aquatic services may include internet services, data tracking, position maintenance services and data, prior aquatic effort data and services, current aquatic effort data and services, and/or predictive suggestions data and services. In one aspect, aquatic services are thinly populated. Aquatic services are thinly populated when data has not been associated with the services. For example, aquatic services are thinly populated when tour data has not been associated with an anchor point or there is no prior aquatic data associated with the anchor point from prior anglers. In such a situation, the services may include shells when the angler is the first person to associate data with anchor point. The interface may provide options to the angler to set up and/or customize services for the anchor point. In another aspect, the aquatic services may be richly populated. Aquatic services are richly populated when tours and/or prior aquatic effort data has been associated with anchor point. In such a situation, an angler may not be prompted to set up the services since they have already been set up.

Operational flow 700 continuous to operation 708 where current aquatic effort data is obtained. Current aquatic effort data pane 408 in FIG. 4 gives a few examples of current aquatic effort data. To further exemplify, current aquatic effort data may include current data from sensors, current data associated with the control of the watercraft, current data associated with the control of a propelling or trolling device, current data associated with a position maintenance routine, time data, date data and/or any other data that may be obtained to identify a current setting within an aquatic or angling environment. The current aquatic effort data may be obtained directly from devices associated with the watercraft and/or current aquatic effort data may be obtained from an internet service that queries devices associated with the watercraft. Current aquatic effort data may also be received from a user input. In other aspects, current aquatic effort data is automatically obtained. In still other aspects, the current aquatic effort data is obtained via a network of watercraft and/or a mesh network of watercraft.

Operational flow 700 continuous to operation 710 where it is determined whether to associate the current aquatic effort data with the aquatic services. Stated another way, the watercraft automation module may automatically associate current aquatic effort data with the aquatic services in the situation where the angler desires sharing angling information with other anglers or for later access. In other situations, whether the current aquatic effort data is associated with the aquatic services may be an angler decision that is input upon being prompted. In other situations, the current aquatic effort data may be locally stored and later uploaded to the aquatic services. In still other situations, the current aquatic effort data may not be associated with the aquatic services thereby keeping the current aquatic effort data private.

When current aquatic effort data is not associated with aquatic services, operational flow 700 continues to decision operations 714 as set forth below. When current aquatic effort data is associated with aquatic services, operational flow 700 continues to operation 712 where the current aquatic effort data is stored with the aquatic services. For example, data from sensors, data from the control of the watercraft and/or trolling device, equipment data, and/or aquatic life quantity and type data may be associated with the aquatic services to update the aquatic services. As previously stated, the storage may include a local storage and/or a remote storage.

Operational flow 700 continues to decision operation 714 where it is determined whether other current aquatic effort data is obtained. If so, operational flow 700 loops back to decision operation 710. If not, operational flow 700 continues to decision operation 716 where it is decided if another anchor point is implicated. Another anchor point may be implicated, for example, by moving the watercraft to a new GPS location or the like. In such a situation, operational flow 700 loops back to operation 706. If not, operational flow 700 ends at end operation 718.

Figure 8:
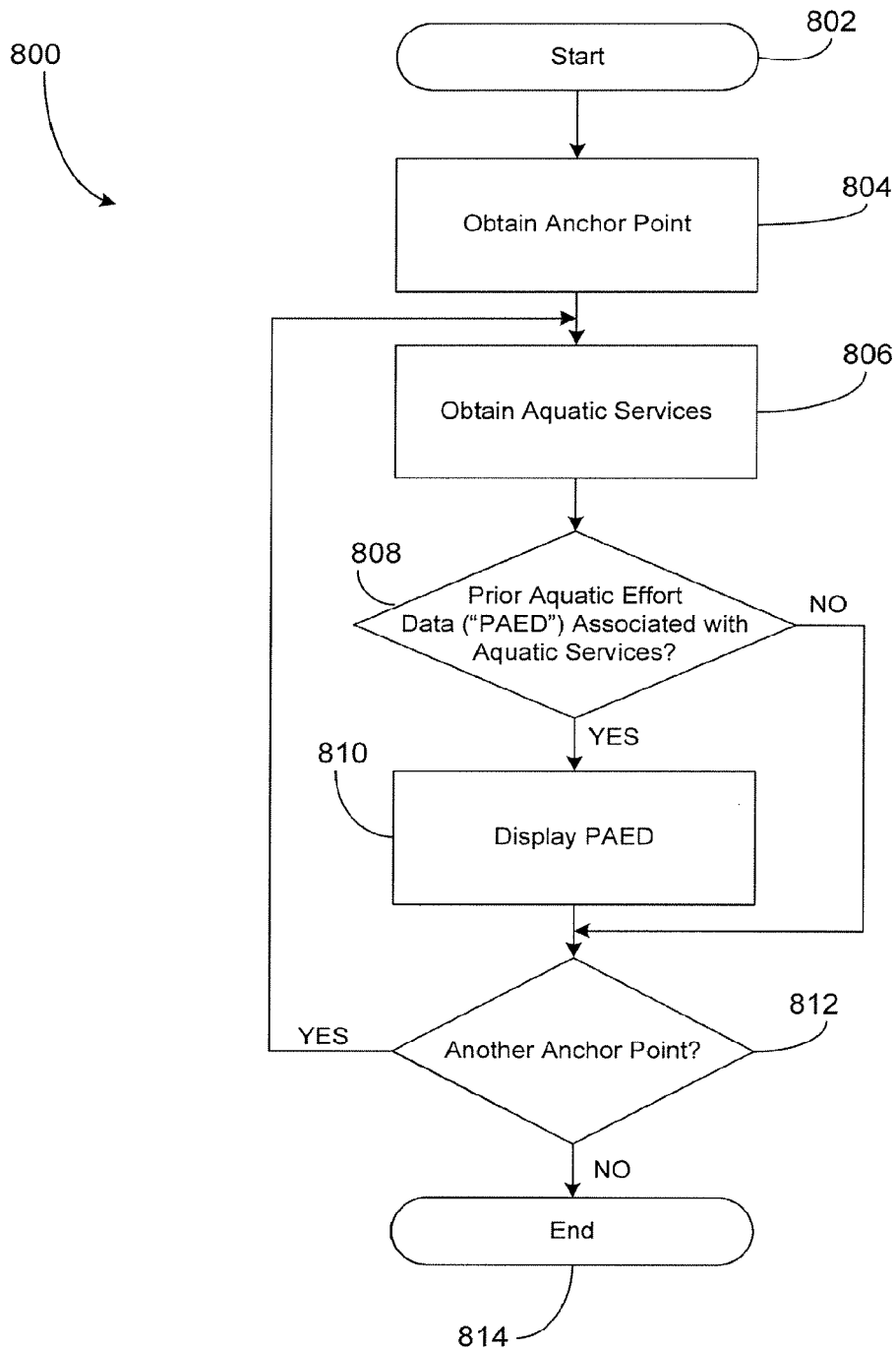
FIG. 8 represents one exemplary operational flow diagram for obtaining prior aquatic effort data.

FIG. 8 represents one exemplary operational flow diagram for obtaining prior aquatic effort data. Operational flow 800 begins at start operation 802 and continues to operation 804, where an anchor point is obtained. As stated, an anchor point may include an identifier such as a directional coordinate, a map coordinate, a GPS identifier and the like. The anchor point may be obtained by a user selection. For example, a user may select a "set anchor" actuator on a display. In such a situation, a GPS coordinate may be received and the anchor point is set to the GPS coordinate. In other situations, an anchor point may be obtained from an internet service, such as a tour service. An anchor point may also be a stored anchor point and obtained from a local storage or a removable storage device. In yet another example, an anchor point may be obtained from another watercraft via a network, the internet, a radio frequency, infrared frequency or the like. In still other situations, an anchor point may be associated with a more generalized location than the anchor point used to maintain a position of the watercraft. For example, the anchor point may include the location of an aquatic body of interest.

Operational flow 800 continues to operation 806 where aquatic services are obtained. Aquatic services may be associated with an internet server, locally stored on a computing device and/or associated with a removable computer-readable storage medium. To obtain the services, the identifier associated with the obtained anchor point is matched to aquatic services. For example, services may be identified by a GPS coordinate. When the GPS identifier of the anchor point matches the GPS coordinate (or the GPS coordinate within a range of coordinates), the matched services are populated on the interface of the watercraft. Aquatic services may also include default services that are populated regardless of the anchor point identifier. For example, an emergency call button, a help button and/or the like may populate on the interface regardless of the location of the anchor point. In other situations, the aquatic services may be identified by a range of positions. For example, aquatic services may be associated with an upper quarter of an aquatic body. When the anchor point identifier indicates that the anchor point is within the upper quarter of an aquatic body, aquatic services are populated on the user interface of the watercraft.

Operational flow 800 continues to decision operation 808 where it is determined whether prior aquatic effort data is associated with the aquatic services. Prior aquatic effort data pane 406 in FIG. 4 gives a few examples of prior aquatic effort data. To further exemplify, prior aquatic effort data may include prior data from sensors, prior data associated with the control of the watercraft, prior data associated with the control of a propelling or trolling device, prior data associated with a position maintenance routine, prior time data, prior date data and/or any other data that may be have been associated with an anchor point during a prior angling or tour event. The prior aquatic effort data may be obtained directly from devices associated with the watercraft and/or prior aquatic effort data may be obtained from an internet service that queries devices associated with the watercraft. In still other aspects, the current aquatic effort data is obtained via a network of watercraft and/or a mesh network of watercraft.

When prior aquatic effort data is not associated with aquatic services, operational flow 800 continues to decision operations 812 as set forth below. When prior aquatic effort data is associated with aquatic services, operational flow 800 continues to operation 810 where the prior aquatic effort data is displayed on an interface. In the situation where the prior aquatic effort data is not locally stared, it may be stored locally. In other aspects, the prior aquatic effort data facilitates the updating of a position maintenance routine and facilitates other prediction suggestions as more fully set forth below in FIG. 9.

Operational flow 800 continues to decision operation 812 where it is determined whether another anchor point is obtained. The another anchor point may be obtained as further set forth above. If so, operational flow 800 loops back to operation 806. If not, operational flow 800 continues to end operation 814.

Figure 9:
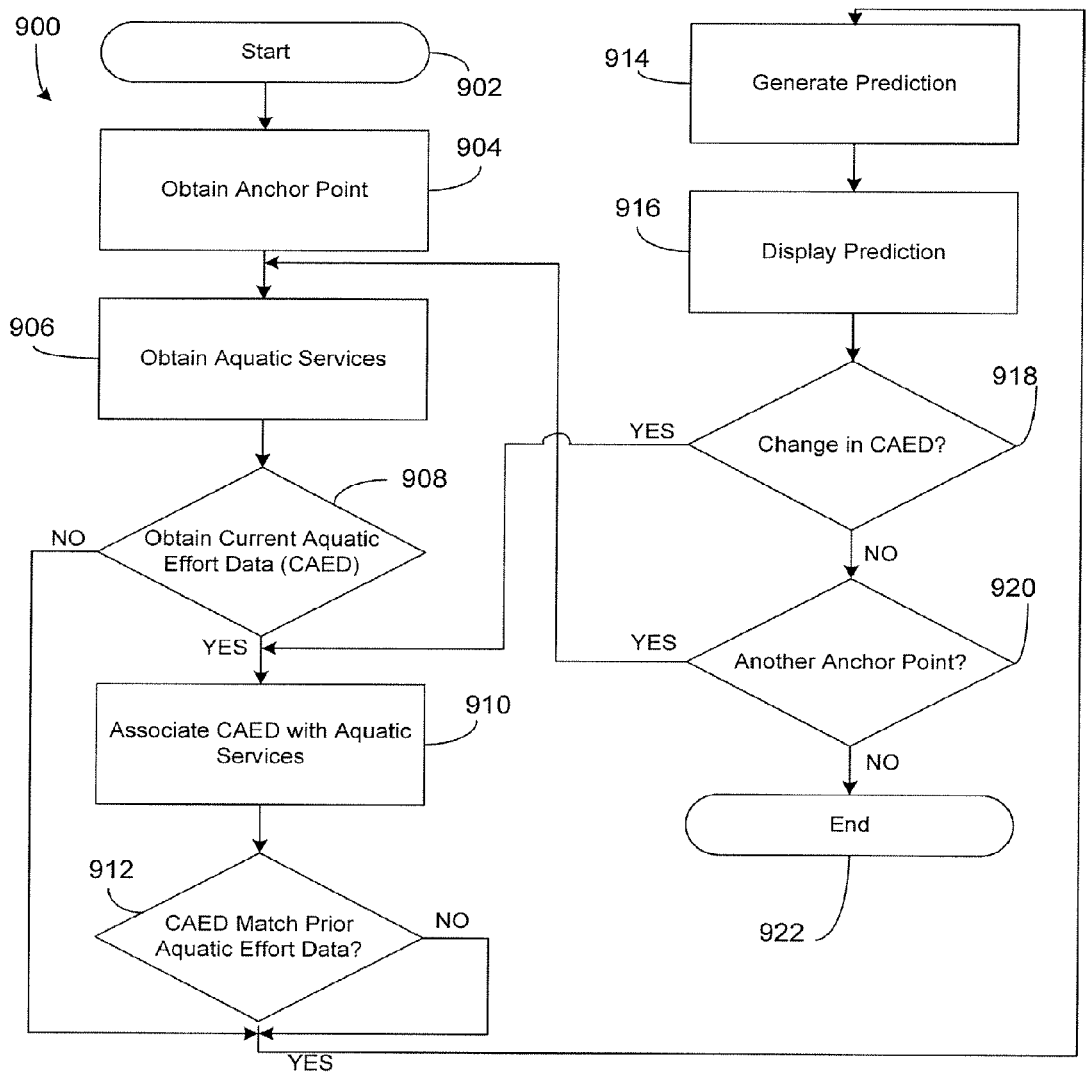
FIG. 9 represents one exemplary operation flow diagram for prediction generation.

FIG. 9 represents one exemplary operation flow diagram for prediction generation. Operational flow 900 begins at start operation 902 and continues to operation 904. At operation 904, an anchor point is obtained. An anchor point may include an identifier such as a directional coordinate, a map coordinate, a GPS identifier and the like. The anchor point may be obtained by a user selection. For example, a user may select a "set anchor"actuator on a display. In such a situation, a GPS coordinate may be received and the anchor point is set at the GPS coordinate. In other situations, an anchor point may be obtained from an internet service, such as a tour service. An anchor point may also be a stored anchor point and obtained from a local storage or a removable storage device. In yet another example, an anchor point may be obtained from another watercraft via a network, the internet, a radio frequency, infrared frequency or the like.

Operational flow 900 continues to operation 906 where aquatic services are obtained. Aquatic services may be associated with an internet server, locally stored on a computing device and/or associated with a removable computer-readable storage medium. To obtain the services, the identifier associated with the obtained anchor point is matched to aquatic services. For example, services may be identified by a GPS coordinate. When the GPS identifier of the anchor point matches the GPS coordinate (or the GPS coordinate within a range of coordinates), the matched services are populated on the interface of the watercraft. Aquatic services may also include default services that are populated regardless of the anchor point identifier. For example, an emergency call button, a help button and/or the like may populate on the interface regardless of the location of the anchor point. In other situations, the aquatic services may be identified by a range of positions. For example, aquatic services may be associated with an upper quarter of an aquatic body. When the anchor point identifier indicates that the anchor point is within the upper quarter of an aquatic body, aquatic services are populated on the user interface of the watercraft.

Operational flow 900 continues to operation 908 where it is determined whether current aquatic effort data is obtained. If not, a canned predictive suggestion may be generated as more fully set forth below. If current aquatic effort data is obtained, operational flow 900 continues to operation 910 where the current aquatic effort data is associated with the aquatic services. Stated another way, the watercraft automation module may automatically associate current aquatic effort data with the aquatic services in the situation where the angler desires sharing angling information with other anglers for later access. In other situations, whether the current aquatic effort data is associated with the aquatic services may be an angler decision that is input upon being prompted. In other situations, the current aquatic effort data may be locally stored and later uploaded to the aquatic services.

Operational flow 900 continues to decision operation 912 where it is determined whether current aquatic effort data matches prior aquatic effort data. The match may include a perfect match, an absolute match, a match within a range of values, a match within a preset range, a match within a threshold and the like. The matching criteria may be set by a user, a group of users, an administrator, a software developer, and the like. A match may include matching a current time, current date and/or current season to a prior time, prior date and/or prior season. A match may also include matching a current environmental condition to a prior environmental condition. As an example, a current temperature may match a prior temperature. A match may also include matching a current watercraft condition to a prior watercraft condition. As a further example, a match may include matching a current aquatic tour to a prior aquatic tour. As another example, a match may include matching a current amount of caught aquatic life to a prior amount of caught aquatic life. As still another example, a match may include matching a current equipment type to a prior equipment type.

If a match exists, operational flow 900 continues to operation 914 where a prediction is generated. If a match does not exist, operational flow 900 continues to operation 914 where a prediction is generated. A prediction may be a canned prediction. For example, a prediction may include generalized angling tips, temperature charts, general tips about a certain area, professional tips, etc. Such canned tips may be generated when no aquatic effort data is obtained and/or when current aquatic effort data does not match any prior aquatic effort data.

As an example of a prediction, a current water temperature may be 80 degrees and a prior water temperature may be 81 degrees. During the prior aquatic effort where the water was 81 degrees, 25 fish may have been caught on a yellow lure. Accordingly, a prediction may be generated to indicate that a yellow lure should be used. As another example, a current wind velocity may be 30 miles per hour and a prior wind velocity may be 30 miles per hour. During the prior aquatic effort where the wind was 30 miles per hour, 50 fish may have been caught in association with an anchor point in a nearby cove. Accordingly, a prediction may be generated to automatically control the position maintenance routine to propel the watercraft to the anchor point associated with the cove. As another example, a current velocity may be 7 miles an hour. A prior tour may indicate that it is best to fish a ridge in a river system while drifting at 2 miles an hour. Accordingly, a prediction may be generated to automatically control the drift of the watercraft via the position maintenance routine to provide a 2 mile an hour drift from a first anchor point to a second anchor point. As still another example, a current number of caught fish may be 50. Prior aquatic effort data associated with a service may indicate that the fishing limit on the lake is 50 fish. Accordingly, a reservation may automatically be made at a restaurant associated with the aquatic services. Other types of reservations may include hotel reservations actuated on the fishing limit or on a time of day. The above examples are but a few examples of a myriad of possible combinations of current aquatic effort conditions, prior aquatic effort conditions, predictions and services. It is evident from the disclosure herein that any number of combinations may exist to produce one or more predictions and/or to control a watercraft. Also, it should be evident from the disclosure herein that any number of services may be automated in light of the current aquatic effort conditions and prior aquatic effort conditions.

Operational flow 900 continues to operation 916 where the prediction is optionally displayed. In the situation where the watercraft automation module is configured to automatically control the watercraft in light of predictions, the prediction may not be displayed and automatically control the trolling device. In other situations, the prediction may include a prediction associated with a technique, equipment and the like. In such a situation, the prediction may be displayed.

Operational flow 900 continues to operation 918 where it is determined whether there has been a change in light of current aquatic effort data. If a change is received, operational flow continues to operation 910. If a change is not received, operational flow 900 continues to decision operation 920. At decision operation 920, it is determined whether another anchor point has been obtained. If so, operational flow 900 continues to operation 906. If not, operational flow 900 continues to end operation 922.

FIG. 10 represents an exemplary system computing device, such as computing device 1000. In a basic configuration, computing device 1000 may include any type of stationary computing device or a mobile computing device. Computing device 1000 typically includes at least one processing unit 1002 and system memory 1004. Depending on the exact configuration and type of computing device, system memory 1004 may be volatile (such as RAM), non-volatile (such as ROM, flash memory, and the like) or some combination of the two. System memory 1004 typically includes operating system 1005, one or more applications 1006, and may include program data 1007. In one embodiment, applications 1006 further include application 1020 for watercraft anchoring and automation. This basic configuration is illustrated in FIG. 10 by those components within dashed line 1008.

Computing device 1000 may also have additional features or functionality. For example, computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer-readable storage mediums may include volatile and non-volatile, removable and non-removable media implemented in any method or technology for storage of information, such as computer readable instructions, data structures, program modules or other data. System memory 1004, removable storage 1009 and non-removable storage 1010 are all examples of computer-readable storage mediums. Computer readable storage mediums includes but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer-readable storage medium may be part of device 1000. Computing device 1000 may also have input device(s) 1012 such as a keyboard, mouse, pen, voice input device, touch input device, etc. Output device(s) 1014 such as a display, speakers, printer, etc. may also be included.

Computing device 1000 also contains communication connection(s) 1016 that allow the device to communicate with other computing devices 1018, such as over a network or a wireless network. Communication connection(s) 1016 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media.

Although the disclosure has been described in language that is specific to structural features and/or methodological steps, it is to be understood that the features defined in the appended claims are not necessarily limited to the specific features or steps described. Rather, the specific features and steps are disclosed as forms of implementing the claimed features. Since many embodiments can be made without departing from the spirit and scope of the disclosure, the invention resides in the claims hereinafter appended.

What is claimed is:

1. A computer-implemented method for utilizing fishing data associated with an anchor point identifier, the computer implemented method comprising:

obtaining, on at least one processor, an anchor point identifier that indicates a position of an anchor point of a boat, wherein the anchor point identifier facilitates indexing of current fishing data obtained at the anchor point of the boat;

obtaining, on the at least one processor, current fishing data, wherein the current fishing data includes at least one member of a group consisting of: a quantity indicator of current fish caught at the anchor point, a fish type indicator that indicates a type of fish currently caught at the anchor point, a fish size indicator that indicates a size of fish currently caught at the anchor point, a lure indicator that indicates a lure attribute for a lure currently utilized at the anchor point, a bait indicator that indicates a bait attribute for a bait currently utilized at the anchor point, a rod indicator that indicates an attribute of a rod currently utilized at the anchor point, and a reel indicator that indicates an attribute of a reel currently utilized at the anchor point; and storing the current fishing data in association with the anchor point identifier to facilitate identification of the current fishing data via the anchor point identifier.

2. The computer-implemented method of claim 1, wherein the current fishing data is obtained via at least one member of a group consisting of: user input and sensors.

3. The computer-implemented method of claim 1, wherein the current fishing data further includes a current position maintenance routine associated with the anchor point.

4. The computer-implemented method of claim 1, wherein the current fishing data further includes current environmental data associated with the anchor point.

5. The computer-implemented method of claim 1, wherein the current fishing data further includes current aquatic tour data associated with the anchor point.

6. The computer-implemented method of claim 1, wherein the current fishing data further includes current social network data associated with the anchor point.

7. The computer-implemented method of claim 6, wherein the current social network data includes at least one member of a group consisting of: text, video streams, and photographs.

8. The computer-implemented method of claim 1, wherein the current fishing data further includes internet services associated with the anchor point.

9. The computer-implemented method of claim 8, wherein the internet services includes at least one member of a group consisting of: mapping services, laws, angling rules, angling limits, restaurants within proximity of the anchor point, hotels within proximity of the anchor point, emergency services, water discharge data, weather report data, dam reports, moon phase reports, tide predictions, river data, water elevation data, and data from a government agency.

10. The computer-implemented method of claim 1, wherein the method is at least partially executed by at least one member of a group consisting of: a telephone device, a cellular telephone device, a satellite telephone device, a stationary computing device, a mobile computing device, a televising device, a mobile audio device, an internet database, and a watch device.

11. The computer-implemented method of claim 1, further comprising storing the current fishing data for association with at least one member of a group consisting of: an open network of users, a closed network of users, a password protected group of users, and a group of users having privileged access.

12. A non-transitory computer-readable storage medium having computer executable instructions for utilizing fishing data associated with an anchor point identifier, the instructions comprising:
obtaining an anchor point identifier that indicates a position of an anchor point of a boat, wherein the anchor point identifier facilitates indexing of current fishing data obtained at the anchor point of the boat;
obtaining current fishing data, wherein the current fishing data includes at least one member of a group consisting of: a quantity indicator of current fish caught at the anchor point, a fish type indicator that indicates a type of fish currently caught at the anchor point, a fish size indicator that indicates a size of fish currently caught at the anchor point, a lure indicator that indicates a lure attribute for a lure currently utilized at the anchor point, a bait indicator that indicates a bait attribute for a bait currently utilized at the anchor point, a rod indicator that indicates an attribute of a rod currently utilized at the anchor point, and a reel indicator that indicates an attribute of a reel currently utilized at the anchor point; and
storing the current fishing data in association with the anchor point identifier to facilitate identification of the current fishing data via the anchor point identifier.

13. The computer-readable storage medium of claim 12, wherein the current fishing data further includes current social network data associated with the anchor point.

14. The computer-readable storage medium of claim 12, wherein the current fishing data further includes internet services associated with the anchor point.

15. The computer-readable storage medium of claim 12, wherein the computer executable instructions are is at least partially executed on at least one member of a group consisting of: a telephone device, a cellular telephone device, a satellite telephone device, a stationary computing device, a mobile computing device, a televising device, a mobile audio device, an internet database, and a watch device.

16. The computer-readable storage medium of claim 12, further comprising storing the current fishing data for association with at least one member of a group consisting of: an open network of users, a closed network of users, a password protected group of users, and a group of users having privileged access.

17. A system for utilizing fishing data associated with an anchor point identifier, the system comprising:
at least one processor; and
at least one memory having computer executable instructions thereon, wherein the computer executable instructions are configured for:
obtaining an anchor point identifier that indicates a position of an anchor point of a boat, wherein the anchor point identifier facilitates indexing of current fishing data obtained at the anchor point of the boat;
obtaining current fishing data, wherein the current fishing data includes at least one member of a group consisting of: a quantity indicator of current fish caught at the anchor point, a fish type indicator that indicates a type of fish currently caught at the anchor point, a fish size indicator that indicates a size of fish currently caught at the anchor point, a lure indicator that indicates a lure attribute for a lure currently utilized at the anchor point, a bait indicator that indicates a bait attribute for a bait currently utilized at the anchor point, a rod indicator that indicates an attribute of a rod currently utilized at the anchor point, and a reel indicator that indicates an attribute of a reel currently utilized at the anchor point; and
storing the current fishing data in association with the anchor point identifier to facilitate identification of the current fishing data via the anchor point identifier.

18. The system of claim 17, wherein the current fishing data further includes at least one member of a group consisting of: current social network data associated with the anchor point, and internet services associated with the anchor point.

19. The system of claim 17, wherein the processor is associated with at least one member of a group consisting of: a telephone device, a cellular telephone device, a satellite telephone device, a stationary computing device, a mobile computing device, a televising device, a mobile audio device, an internet database, and a watch device.

20. The system of claim 17, further comprising storing the current fishing data for association with at least one member of a group consisting of: an open network of users, a closed network of users, a password protected group of users, and a group of users having privileged access.

* * * * *